United States Patent [19]

Peterson

[11] Patent Number: 4,532,028
[45] Date of Patent: Jul. 30, 1985

[54] METHOD FOR REDUCING CONTENT OF HALOGENATED AROMATICS IN HYDROCARBON SOLUTIONS

[75] Inventor: Robert L. Peterson, North Syracuse, N.Y.

[73] Assignee: Niagara Mohawk Power Corporation, Syracuse, N.Y.

[21] Appl. No.: 544,788

[22] Filed: Oct. 24, 1983

[51] Int. Cl.$^3$ ............................................. C10G 17/00
[52] U.S. Cl. ................................................... 208/262
[58] Field of Search ........................................ 208/262

[56] References Cited

U.S. PATENT DOCUMENTS

| | | | |
|---|---|---|---|
| 2,481,300 | 9/1949 | Engel | 196/136 |
| 3,481,991 | 12/1969 | Cohen | 260/263 |
| 4,326,090 | 4/1982 | Smith et al. | 585/469 |
| 4,327,027 | 4/1982 | Howard | 260/340.3 |
| 4,337,368 | 6/1982 | Pytlewski et al. | 568/730 |
| 4,351,718 | 9/1982 | Brunelle | 208/262 |
| 4,353,793 | 10/1982 | Brunelle | 208/262 |
| 4,477,354 | 10/1984 | Fessler | 210/634 |

FOREIGN PATENT DOCUMENTS 49-82570 8/1974 Japan .
1143170 2/1969 United Kingdom .
1316277 5/1973 United Kingdom .

OTHER PUBLICATIONS

Chem. Abs., 81, 135262e, Sawai (I).
Chem. Abs., 85, 112349q, Sawai (II).
Chem. Abs., 88, 152143d, Mochizuki.
Yamatani et al., "Dehydrotropolones: A Benzyne-Type Intermediate", Tetrahedron Letters No. 20, pp. 1725–1728 (1970).
Hales et al., J. Org. Chem., vol. 36, No. 2, pp. 314–322 (1971).
Pytlewski et al., "The Reaction of PCB's with Sodium, Oxygen and Polyethylene Glycols", U.S. EPA Off, Treat Haz. Waste Sym., (1980), pp. 72–76.

Primary Examiner—Curtis R. Davis
Attorney, Agent, or Firm—Fitzpatrick, Cella, Harper & Scinto

[57] ABSTRACT

The level of halogenated aromatics is reduced in a hydrocarbon stream by treatment with an alkaline reactant in a sulfoxide solvent.

11 Claims, 2 Drawing Figures

METHOD FOR REDUCING CONTENT OF HALOGENATED AROMATICS IN HYDROCARBON SOLUTIONS

BACKGROUND OF THE INVENTION

1. Field Of The Invention

The present invention relates to the treatment of halogenated aromatics in hydrocarbon streams. In particular, it relates to a method for reducing the content of polychlorinated biphenyls in transformer oils containing them.

2. Description Of The Prior Art

The biodegradability of halogenated aromatic compounds, particularly chlorinated aromatics, is recognized to be related to the number of halogen atoms present in such compounds. Accordingly, it is desirable to reduce the number of halogens in such compounds to enhance their biodegradability. It is known that displacement of halogen groups in such compounds to produce their phenolic counterparts or ether precursors reduces the solubility of such compounds in organic streams and increases the solubility of such compounds in polar solvents.

Polychlorinated biphenyls or "PCB's" were long used as dielectric fluids in electrical equipment and the like because such materials possessed excellent heat stability, are non-flammable in nature, exhibit low volatility and present good viscosity characteristics at ambient operating temperatures. However, the highly chlorinated "PCB's" are almost indestructible by the environment. When present in water, they tend to concentrate in the tissue of fish, thereby producing an adverse effect on humans eating fish contaminated with such compounds. Because of their environmental persistence, the continued manufacture and importation and the new use in the United States of such PCB's was banned in 1976 and the U.S. Environmental Protection Agency promulgated rules and regulations for their removal from commerce.

As of July 1, 1979, EPA regulations defined as "PCB-contaminated" any material containing more than 50 parts per million (ppm) of a mono-, di-, or polychlorinated biphenyl. While PCB-contaminated materials can be disposed of by incineration or in a secure land fill, such procedures have rarely proven acceptable to the community at large.

Considerable fractions of transformer oils now in service are PCB-contaminated. Transformer oils include, for example, refined asphaltic-base mineral oil, and heat exchange oils, such as hydrogenated terphenyls. Accordingly, it has long been desired to provide an effective and safe method for disposing of PCB-contaminated transformer oils. As employed hereafter, the term "transformer oil" means a mineral insulating oil of petroleum origin for use as an insulating and cooling media in electrical and other apparatus.

Other halogenated aromatic hydrocarbons presenting acute environmental problems include the chlorinated aromatic dioxins, such as 2, 3, 7, 8-tetrachlorodibenzo-p-dioxin, chlorinated aromatics, such as 2, 4, 5-trichlorophenol, DDT and polybrominated biphenyls.

Various methods have been proposed for reducing the level of halogenated aromatic hydrocarbons in hydrocarbon streams. In U.S. Pat. No. 4,326,090, halogenated organics were dehalogenated by reacting them with sodium naphthalenide in the presence of sodium metal. The preparation of sodium naphthalenide is expensive and potentially hazardous. Further, the process requires a multistep procedure involving the incorporation of the organo-sodium compound into PCB contaminated oil, followed by a minimum of a two hour reaction time, a water quench, and distillation and purification steps to recycle the potentially hazardous reaction solvent.

It has also been proposed to destroy polychlorinated biphenyls utilizing a sodium dispersion in kerosene. This reaction requires an extended heating period. The use of sodium metal necessitates the implementation of special handling procedures and the elimination of even trace amounts of water to avoid side reactions. Pytlewski, et al. of the Franklyn Research Center has reported on the reaction of PCB's with sodium, oxygen and polyethylene glycols in *Treat. Haz. Waste. Symp.*, (1980). It was said that PCB's and other halogenated pesticides could be decomposed employing molten sodium metal dispersed in polyethylene glycols. However, the use of metallic sodium is dangerous and even trace amounts of water must be eliminated to minimize dangerous side reactions.

It has been further proposed to reduce the level of polychlorinated aromatics dissolved in organic solvents such as transformer oil, by treating the contaminated solution with a mixture of a polyethylene glycol or a derivative thereof and an alkali metal hydroxide as set forth in U.S. Pat. Nos. 4,351,718 and 4,353,793. However, it has been found that such reactions require extended periods of time to reduce the concentration of halogenated contaminants, such as PCB's, to generally acceptable levels. A similar process disclosed in U.S. Pat. No. 4,327,027 for the reduction of chlorinated aromatic dioxins is subject to essentially the same defects.

It is well known that dimethyl sulfoxide (DMSO) is a solvent which is generally immiscible in hydrocarbon oils, but is useful in extracting unsaturated compounds, such as aromatic hydrocarbns, from hydrocarbon streams. However, due to its high boiling point, DMSO is not a solvent of choice for removing halogenated aromatic contaminants to reduce their concentration to acceptably low levels.

DMSO has also been employed as a reaction solvent in displacement reactions employing an alkoxide to dehalogenate certain monohalogenated aromatic compounds also containing certain activating groups. Monohaloaromatics containing such activating groups as nitro, keto, hydroxy or the like are said to dehalogenate when sufficiently heated with an alkoxide dissolved in DSMO. *Tetrahedron Letters*, No. 20, pp. 1725–1728 (1970) and United Kingdom Pat. Nos. 1,143,170 and 1,316,277. Similarly, monohalonaphthalenes were said to dehalogenate using potassium butoxide in DMSO at elevated temperatures. *J. Org. Chem.*, Vol. 36, pp. 314–322 (1971).

Polyhalogenated aromatics on the other hand have been disclosed to resist dehalogenation except with highly dangerous strong bases, such as alkali metals, organo metallics, or alkali amides. Recently, it has been proposed to employ alkoxides and hydroxides in polyethylene glycols to dehalogenate polyhalogenated aromatics. However, as previously discussed, such processes were found to require many hours to reduce the levels of polyhalogenated contaminants to acceptable levels.

Many groups have advocated a massive effort to eliminate polyhalogenated aromatics from the environment. However, conventional dehalogenation processes simply have not met with wide public acceptance owing, in part, to their potential hazard and undue expense.

SUMMARY OF THE INVENTION

The present invention provides a method for reducing the content of halogenated aromatic hydrocarbons in a hydrocarbon solution which comprises heating an agitated hydrocarbon solution having therein up to about 50,000 parts per million (ppm) of said solution of a halogenated aromatic hydrocarbon as a contaminant with an alkaline reactant in a sulfoxide solvent, said alkaline reactant selected from the group consisting of (i) an alkali metal alcoholate, (ii) a mixture of an alkali metal hydroxide and an alcohol or (iii) mixtures thereof. The present invention is effective in treating monohalogenated aromatic hydrocarbons and it is intended to include them within the scope of the present process.

The sulfoxide solvent acts to extract the halogenated contaminant from the organic phase into the solvent phase. The sulfoxide then acts to catalyze the halogen displacement reaction between the alkaline reactant and the contaminant to provide the resulting hydroxy substituted counterpart or ether precursor. The extraction rate of the contaminant from the organic phase by the sulfoxide solvent is believed to be the rate controlling step for the process. That extraction rate is enhanced by either increasing the quantity of sulfoxide solvent, by increasing the rate of agitation (or mixing), or both. The process is capable of efficiently reducing the PCB concentration of a given hydrocarbon oil from 50,000 ppm to less than 2 ppm. For oils containing less than about 5000 ppm PCB's, the reaction is usually complete in 60 minutes or less at moderate temperatures.

DESCRIPTION OF PREFERRED EMBODIMENTS

Figure 1:
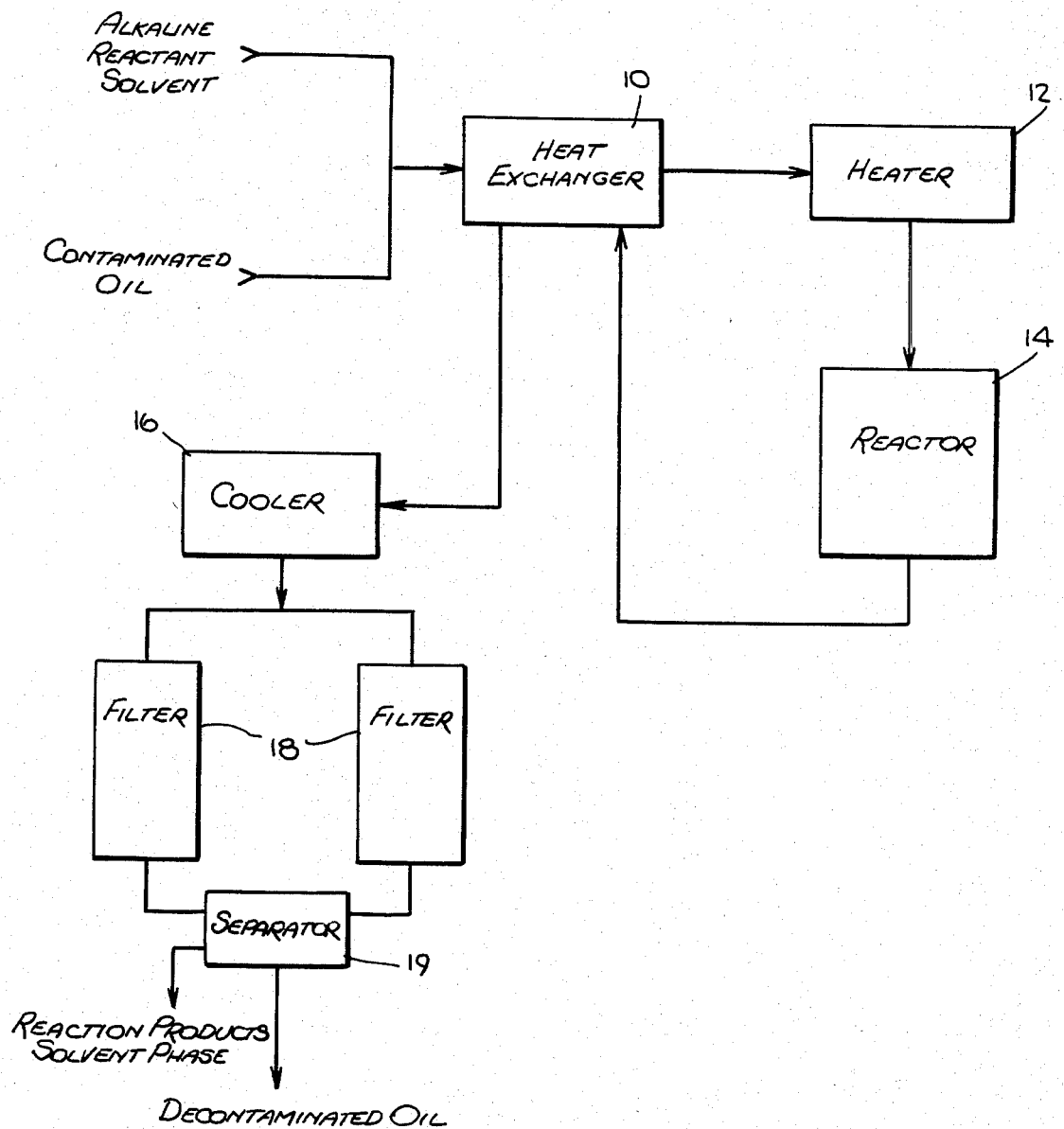
FIG. 1 is a flow diagram of one embodiment of the invention.

The sulfoxide reaction solvent acts to extract the trace amounts of halogenated aromatics in the hydrocarbon solution and to concentrate them in the same phase as the alkoxide or hydroxide and to catalyze their reaction. For this and other purposes, it is preferred to employ a sulfoxide which is in the liquid form within the broad range of reaction temperatures from about 25° C. to 200° C. Typical sulfoxides employable include heterocyclic sulfoxides having the structural formulae (I) or (II), wherein formula I compounds include:

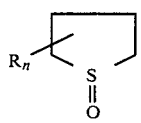

wherein R is lower alkyl and n ib 0, 1, or 2; and wherein formula II compounds include:

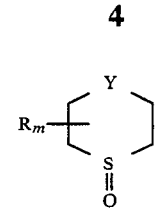

wherein R is lower alkyl, m is 0, 1 or 2 and Y is

and —CX$_2$—, wherein X is hydrogen or lower alkyl providing that the total number of alkyl groups in the ring is no more than 2.

The preferred sulfoxide is an alkyl sulfoxide having the stuctural formula (III):

wherein R$_1$ and R$_2$ are the same or different and are each a C$_1$–C$_4$ alkyl group. Best results are obtained, and, accordingly, it is preferred to employ dimethyl sulfoxide as the sulfoxide solvent in the inventive process. Other extraction solvents may be employed as an adjunct to the sulfoxide, including dioxane, tetrahydrofuran and others. Many otherwise effective nitrogen-based solvents are considered toxic or may form toxic byproducts and, accordingly, simply are undesirable for contemporary waste treatment processes. Such nitrogen-based solvents include dimethyl formamide, methyl pyrrolidone, ethylene diamine and triethanolamine. If use of such solvents can be reconciled with contemporary safety standards, then they can be employed as a reaction solvent.

The alkaline reactant is an alkali metal alcoholate or a mixture of an alkali metal hydroxide and an alcohol. The alkali metal alcoholate is prepared from sodium, potassium or other alkali metal, such as lithium, rubidium or cesium. The alkali metal alcoholate is formed by conventional procedures; for example, by reacting an aqueous solution of an alkali metal hydroxide with a suitable alcohol and thereafter removing the water present. The alcoholate may also be formed by reacting an alkali metal with an alcohol.

The alcohol employed to form the alcoholate is monohydric or polyhydric. Typical alcohols include alkanols having 1 to 5 carbon atoms; aralkanols having 7–11 carbon atoms; alkoxyalkane glycols having 4 to 6 carbon atoms, alkanepolyols having 2 to 5 carbon atoms and 2 to 3 hydroxyls and monoalkyl ethers of such alkanepolyols with alkanols having 1 to 4 carbon atoms.

The preferred alcoholates are derived from C$_1$ to C$_5$ primary, secondary and tertiary alkanols, and include sodium methoxide, sodium ethoxide, potassium propoxide, sodium sec-butoxide, potassium tert-pentoxide and, most preferably, potassium tert-butoxide.

The alcohols employed with the alkali metal hydroxide are typically those employed to prepare the alcoholates. Typical useful alcohols include lower alkanols, such as methyl, ethyl and propyl alcohol and, especially, tert butanol; aralkanols, such as benzyl alcohol;

alkanepolyols having 2 to 5 carbon atoms and 2 to 3 hydroxy groups, such as ethylene glycol and propyleneglycol; polyalkylene polyols, as polypropylene polyols, especially polyethylene glycol; polyolethers, as methyl carbitol, and unsaturated alcohols, such as polyvinyl alcohol.

Mixtures of the alkali metal alcoholates, alkali metal hydroxide and alcohols can be employed, if desired.

The hydrocarbon solution which is subject to decontamination by the process of the invention is a substantially inert hydrocarbon having therein a halogenated aromatic contaminant. The broad spectrum of hydrocarbon solutions or streams from the high boiling, still-bottom residues containing chlorinated aromatic dioxins, to the PCB-containing, refined asphaltic-base mineral oils, or heat exchange oils can be treated by the inventive process. Transformer oil containing up to about 50,000 ppm, and especially 5000 ppm of PCB's is particularly amenable to successful treatment.

The present process is applicable to reduce the content in hydrocarbon streams of the broad scope of halogenated aromatic hydrocarbons, including iodo-, bromo- and chlorinated aromatics, such as chlorinated aromatic dioxins, especially, 2, 3, 7, 8-tetrachlorodibenzo-p-dioxin; chlorinated aromatics, such as 2, 4, 5-trichlorophenol; chlorosubstituted phenolic esters; DDT and polybrominated biphenyls. The process is especially useful in removing chlorinated biphenyls of the structural formula:

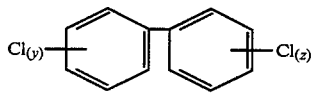

(IV)

wherein y and z are integers from 1–5.

PCB's, as employed commercially, are usually mixtures of up to 14 different isomers. Typical mixtures include PCB 1260, PCB 1254 and PCB 1242.

In the practice of the invention the alkoxide or hydroxide/alcohol mixture is combined with the sulfoxide solvent and the resulting reactant solvent mix is admixed with the contaminated hydrocarbon stream to be treated, under agitation. The reaction mixture is heated, if necessary, to a preselected reaction temperature. The reaction then continues until the halogenated aromatic hydrocarbon is converted to its ether or phenolic product. Thereafter, the sulfoxide phase, containing the reaction product, is separated from the purified hydrocarbon phase. Because the solvent and hydrocarbon phases are immiscible, they can be readily separated after completion of the reaction by cooling the mixture and allowing the phases to separate gravimetrically.

The rate of the reaction is based, inter alia, on the proportions of sulfoxide and alkaline reactant, the degree of mixing and the reaction temperature. In general, the limiting step is the rate of extraction of the contaminant by the solvent phase. The extraction can be enhanced by providing greater relative proportions of sulfoxide and reagent mixture and by increasing the degree of agitation to permit the sulfoxide to chase down and extract trace quantities of contaminant. In general, it is preferred to increase the degree of mixing rather than to utilize excess solvent in order to reduce loss of the desired purified hydrocarbon phase in the separation step.

The halogen displacement reaction is believed to primarily take place in the solvent phase, where the proportion of alkali, type of alkali and reaction temperature are the key factors in enhancing the speed and efficiency of that reaction.

The degree of mixing can be an important factor when relatively low concentrations of halogenated contaminant, usually less than 5000 ppm more often less than 500 ppm, are initially present. Accordingly, employing a mixer capable of a high degree of agitation is desirable. The mixer should preferably be capable of generating high shear mixing, such as that produced by a homogenizer.

The alkaline reactant is present in at least twice the stoichiometric amounts of the halogenated contaminant. For enhanced results, at least 2 moles of alkaline reactant are present per mole of halogen. Best results are obtained, and accordingly, it is preferred to employ the alkoxide and/or the alkali metal hydroxide-alcohol reactant in a mole ratio from about 3:1 to 100:1 of alkaline reactant to halogen.

The sulfoxide or mixture of sulfoxide and alcohol is employed in amounts sufficient to dissolve the reactants. The quantity of solvent employed will accordingly depend upon the type and amount of halide contaminant present, the mixing rate selected and the quantity of alcohol, if any, employed. In general, the higher the concentration of contaminant the greater the quantity of sulfoxide employed. Usually from about 1% to 40% by volume of hydrocarbon solution of sulfoxide or mixture is sufficient to solubilize the reactants required to remove up to about 5000 ppm of contaminant. For concentrations of PCB's from about 500 to 5000 ppm generally from about 10% to 40% by volume of sulfoxide is sufficient. For concentrations of PCB's less than about 500 ppm, usually from about 1% to 5% by volume of sulfoxide is sufficient.

The reaction temperature is usually from about ambient temperature to the decomposition temperature of the hydrocarbon stream or reagent being treated. In general, for transformer oils containing PCB's, the reaction temperature can range from about 25° C. to 200° C. To reduce the energy requirements of the process and to prevent formation of undesired, and possibly toxic, side products in the transformer oils, the reaction temperature is maintained preferably from about 90° C. to 120° C.

The reaction can be run in the presence or absence of air. However, if air is present, then at higher reaction temperatures various side reactions tend to occur. For example, the alcohol may oxidize to a carboxylic acid. If desired, the reaction can be run in the presence of an inert gas, such as nitrogen. Minor amounts of water can be present in the reaction mix. However, excess amounts of water will interfere with the halogen displacement reaction and should generally be avoided.

The process can be operated as a batch process or with continuous recycling as more particularly described with reference to FIGS. 1 and 2.

In FIG. 1 a batch reaction is illustrated for removing PCB's from transformer oil utilizing DMSO solvent. The alkaline reactant, solvent and contaminated hydrocarbon are heated to elevated temperatures approaching a desired reaction temperature in a heat exchanger 10. The preheated reactants are brought to the final reaction temperature in a heater 12 and thereafter conducted to reactor 14, where the reaction is initiated by agitating the reactants to disperse the solvent phase with the hydrocarbon phase. A mixer (not shown) is employed to agitate the reactor contents and to accelerate the reaction.

Thereafter, the resulting heated reaction mixture and entrained reaction products are conducted through heat exchanger 10 to cooler 16 to help reduce the oil temperature. The reaction mixture is then conducted through filters 18 to remove insoluble reaction products, such as salts and phenolic displacement products, from the reaction stream.

The filtered reaction stream is conducted through separator 19 to provide a solvent phase and a hydrocarbon phase. The solvent phase, containing unreacted polyhalogenated contaminant, sulfoxide solvent and unreacted alkaline reactant is exhausted or recycled for further treatment. The decontaminated hydrocarbon stream is collected for reuse.

If desired, the cooling step can be conducted by cooling the product stream to temperatures at which the DMSO/reagent mixture will solidify, thereby trapping the reaction products in that phase. The frozen phase can then be removed by filtration. Further, other procedures can be employed for separating the solvent and hydrocarbon phases, including, for example, centrifuging, employing coalescing means and the like.

Figure 2:
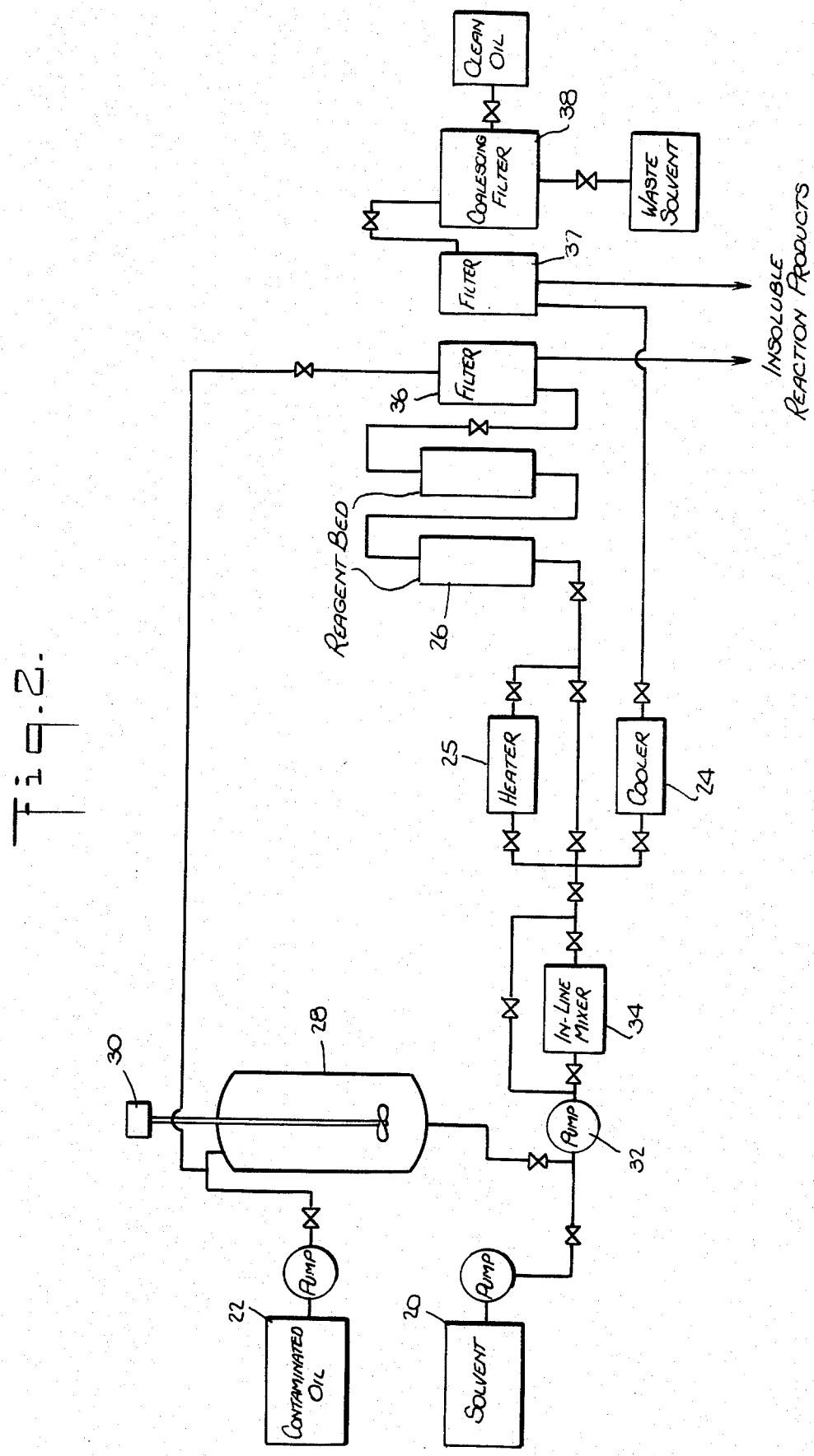
FIG. 2 is a schematic flow diagram of a second embodiment of the invention.

In a second embodiment, as shown in FIG. 2, a process is described in which additional alkaline reactant is supplied to the displacement reaction mixture to replace the alkali consumed during the reaction. This procedure maintains the alkali concentration at a relatively constant level and reduces the tendency for the reaction rate to drop due to decreasing base strength. The continuous removal of reaction product also reduces the possible loss of extraction efficiency of the solvent due to saturation of the solvent phase with such product.

In the embodiment of FIG. 2 contaminated oil is continuously added to reactor 28 equipped with mixer 30. Make-up solvent is conducted through pump 32 and in-line mixer 34 where it is mixed with the oil. The oil-solvent mixture is then passed through heater 25 to bring up the temperature of the stream close to the desired reaction temperature. The stream is then conducted through reagent beds 26 of alkaline reagent pellets to supply the alkaline reactant. Particulate filter 36 then removes the entrained reaction products in the stream. The oil-solvent mixture is then recycled to reactor 28. In order to recover decontaminated oil, a portion of the reaction stream is conducted through cooler 24, filter 37 and through coalescing filter 38 to separate the solvent and purified hydrocarbon phases and the clean oil is recovered. Waste solvent is retained for purification and/or further use.

The following examples represent certain illustrative embodiments of the invention and do not limit or define its scope.

EXAMPLE 1

To a three-neck flask fitted with an agitator, a condenser and a thermometer, were added 100 milliliters (ml.) of clean transformer oil containing approximately 5000 parts per million (ppm) of PCB 1254, 30 grams (g.) of potassium hydroxide, 14 ml. of benzyl alcohol and 20 ml. of dimethyl sulfoxide. The flask was heated with an electric mantle controlled by a rheostat and maintained at a reaction temperature of 100° C. Oil samples were periodically taken without stopping the reaction and the oil analyzed for PCB content. The contents of the flask were agitated. The PCB content was reduced from 5000 ppm to less than 2 ppm in approximately 45 minutes.

EXAMPLE 2

The procedure of Example 1 was repeated except that the reaction mix was 500 ppm of PCB 1254, 3.6 g. potassium hydroxide, 1.4 ml. benzyl alcohol and 2 ml. of dimethyl sulfoxide. The time required to reduce the PCB content to 2 ppm was less than 30 minutes.

EXAMPLE 3

The procedure of Example 2 was repeated except that the reaction solvent was 5 ml. KOH-saturated methyl carbitol in 5 ml. of DMSO. The PCB content was reduced from 500 ppm to 2 ppm in under 60 minutes.

EXAMPLE 4

The procedure of Example 2 was repeated except that the alkaline reactant was 1.4 g. of potassium tert-butoxide and 3.6 g. of potassium hydroxide. The time to reduce the content of PCB's to less than 2 ppm from 500 ppm was less than 60 minutes.

EXAMPLE 5

In order to illustrate the effect of the mixing rate on the process of the invention the process of Example 2 was repeated for two separate runs, wherein the contaminant was 500 ppm of trichlorobenzene (TCB) instead of 500 ppm of PCB 1254. In the first run (run 1) the rate of agitation was 400 rpm, and in the second run (run 2) the rate of agitation was 2500 rpm. The results were as follows:

| Run | Agitation Rate Rate (rpm) | Content of TCB after 2 hours (in ppm) |
| --- | --- | --- |
| 1 | 400 | 25 |
| 2 | 2500 | 5 |

EXAMPLE 6

In order to illustrate the effect of a sulfoxide of the invention, a series of comparative tests were conducted employing a polyalkylene glycol and alkali metal hydroxide reagent system as generally disclosed in U.S. Pat. No. 4,351,718.

In the three-neck flask apparatus as described in Example 1 were charged: 100 ml. of clean transformer oil containing approximately 500 ppm of 1, 2, 4-trichlorobenzene (TCB), 2.67 g. sodium hydroxide (NaOH) and 6.0 ml. of polyethylene glycol 400 (PEG 400*). A second volume of contaminated transformer oil was treated in the same manner except that 6.0 ml. dimethylsulfoxide (DMSO) was also added. Each volume of oil was allowed to react for 2 hours at 100° C. under nitrogen gas with an agitator speed of 350 rpm. Each flask was sampled periodically and the oil analyzed for TCB content with the results as shown below:

*PEG 400 is a polyethylene glycol having an average molecular weight of 400.

| | PPM TCB | |
| --- | --- | --- |
| Time (min.) | NaOH/PEG System | NaOH/PEG/DMSO System |
| 0 | 589 | 550 |
| 15 | 568 | 482 |
| 60 | 547 | 145 |
| 120 | 494 | 75 |

After 120 minutes, only 16% of the TCB's were removed with the NaOH/PEG 400 system as compared to 86% removal with NaOH/PEG 400/ DMSO system. The addition of DMSO increased the reaction rate by a factor of 5.4.

EXAMPLE 7

The apparatus of Example I was used to test the effect of DMSO on the rate of reaction with PCB 1254 in clean transformer oil. In Flask 1 was charged 100 ml. of oil containing 500 ppm PCB 1254, 3.0 g. powdered potassium hydroxide (KOH) and 3.0 g. PEG 1000**. To Flask 2 were charged 100 ml. of oil containing 500 ppm PCB 1254, 1.5 g KOH, 1.5 g. PEG 1000 and 2.0 ml. DMSO. Each flask was allowed to react with stirring under nitrogen gas at 100° C. The following results were obtained:

** PEG 1000 is polyethylene glycol having an average molecular weight of 1000

| Time (min.) | PPM PCB 1254 | |
|---|---|---|
| | Flask 1 KOH/PEG | Flask 2 KOH/PEG/DMSO |
| 0 | 508 | 512 |
| 3 | — | 92 |
| 15 | 47 | — |
| 30 | 9.3 | 1.7 |
| 120 | — | 1.3 |
| 360 | 2.2 | — |
| 600 | 1.0 | — |

The KOH/PEG/DMSO reaction reduced PCB levels to below 2 ppm in only 30 minutes, while the KOH/PEG reaction, without DMSO, required 6–10 hours for the same removal. No measurements were taken at those intervals denoted by dashes.

EXAMPLE 8

Another series of comparative tests was conducted in accordance with the procedure of Example 6 in which a first reaction system employed as the alkaline reactant 9 g. of polyethylene glycol 1000 and 4 g. potassium hydroxide and a second reaction system employed 1.5 g. potassium hydroxide, 1.5 ml. of PEG 1000 and 2 ml. of dimethyl sulfoxide. The PEG 1000/KOH system removed only 23% of the TCB's in 2 hours, while the PEG 1000/KOH/DMSO system removed 78% of the TCB's in 2 hours.

EXAMPLE 9

In order to illustrate the effect of temperature on the process of the invention, two runs were generally conducted in accordance with the procedure of Example I, except that in run 1 a shaker table provided agitation and the alkaline reagent was 5.6 g. potassium hydroxide and 1.7 ml. benzyl alcohol and the solvent was 2.3 ml. DMSO. In run 2 the alkaline reagent was 3 g. potassium hydroxide and 1.4 ml. benzyl alcohol. The solvent was 2 ml. DMSO. The reaction temperature was maintained at 25° C. in run 1 and 100° C. in run 2. The results were as follows:

| Run | Reaction Temperature C.° | Time (in hours) to <2 ppm |
|---|---|---|
| 1 | 25 | 49 ppm after 20 hours |
| | | 55 ppm after 70 hours |
| 2 | 100 | 90 minutes |

The invention is not to be limited except as set forth in the following claims.

What is claimed is:

1. Method for reducing the content of halogenated aromatic hydrocarbons in a hydrocarbon solution which comprises heating under agitation a hydrocarbon solution having therein up to about 50,000 parts per million of said solution of halogenated aromatic hydrocarbon as a contaminant with a nonaqueous alkaline reactant in a sulfoxide solvent, said alkaline reactant selected from the group consisting of (i) an alkali metal alcoholate, (ii) a mixture of an alkali metal hydroxide and an alcohol or (iii) mixtures thereof.

2. The method of claim 1 in which said hydrocarbon solution is a transformer oil.

3. The method of claim 1 in which said halogenated aromatic hydrocarbon is a polychlorinated biphenyl.

4. The method of claim 1 in which the sulfoxide is a lower alkyl sulfoxide.

5. The method of claim 4 in which the sulfoxide is dimethyl sulfoxide.

6. The method of claim 1 in which the reaction is conducted at a reaction temperature from about 25° to 200° C.

7. The method of claim 6 in which the reaction is conducted at temperatures from about 90° C. to 120° C.

8. The method of claim 1 in which the alkaline reactant is an alkali metal lower alkanoate.

9. The method of claim 1 in which the alkaline reactant is an alkali metal hydroxide and a polyethylene glycol.

10. The method of claim 1 including the steps of separating the mixture after reaction into a hydrocarbon phase and a solvent phase; removing insoluble reaction product from the solvent; adding additional alkaline reactant to said purified solvent phase and recycling the solvent phase and the hydrocarbon phase for removal of remaining contaminant.

11. The method of claim 1 in which the contaminated hydrocarbon is a transformer oil having therein up to about 5,000 parts per million of a polychlorinated biphenyl.

* * * * *